Figure 6:
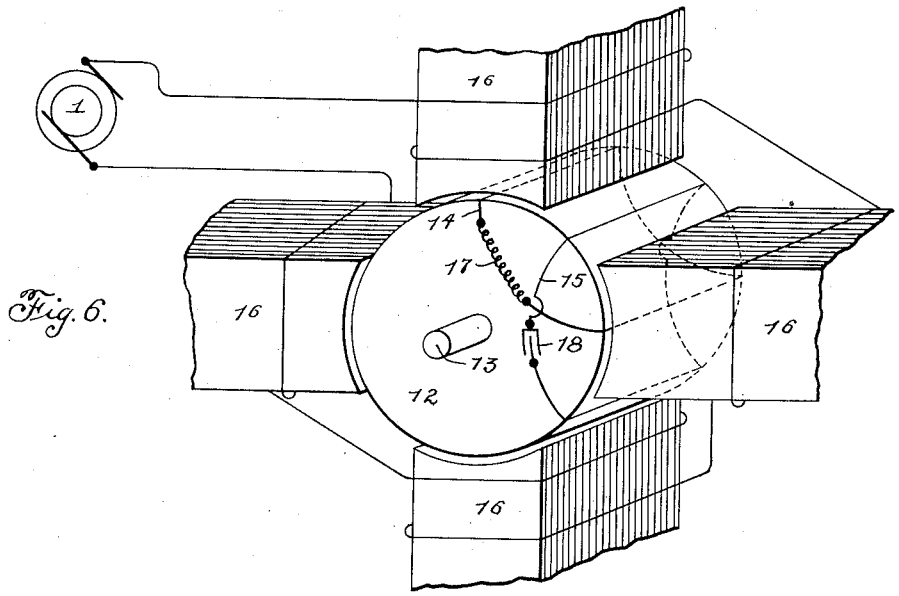

No. 875,179. PATENTED DEC. 31, 1907.
D. C. JACKSON.
ALTERNATING CURRENT MOTOR.
APPLICATION FILED APR. 1, 1901. RENEWED MAR. 17, 1904.
2 SHEETS—SHEET 1.
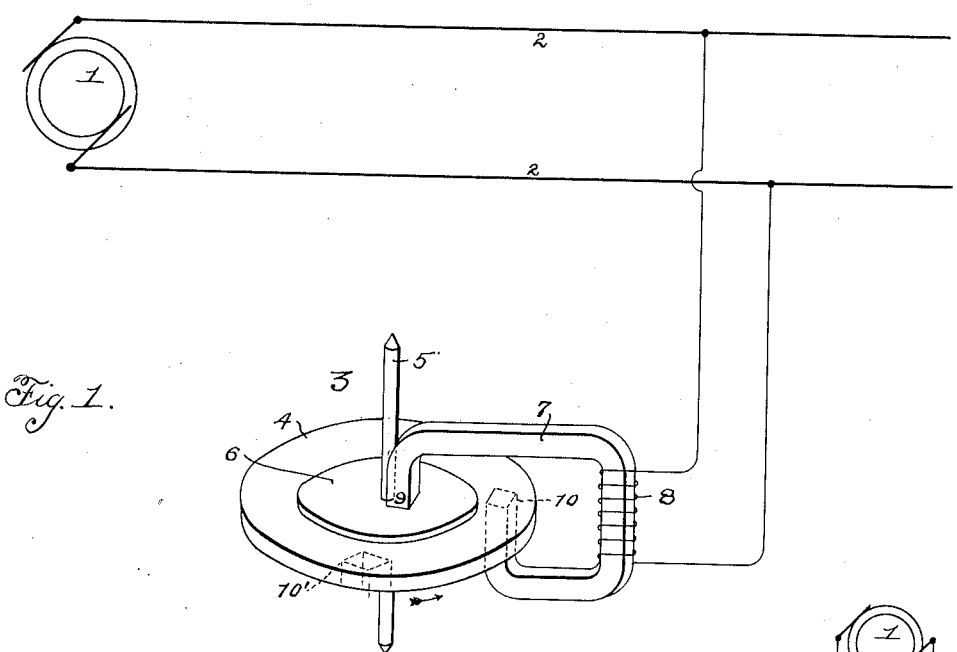
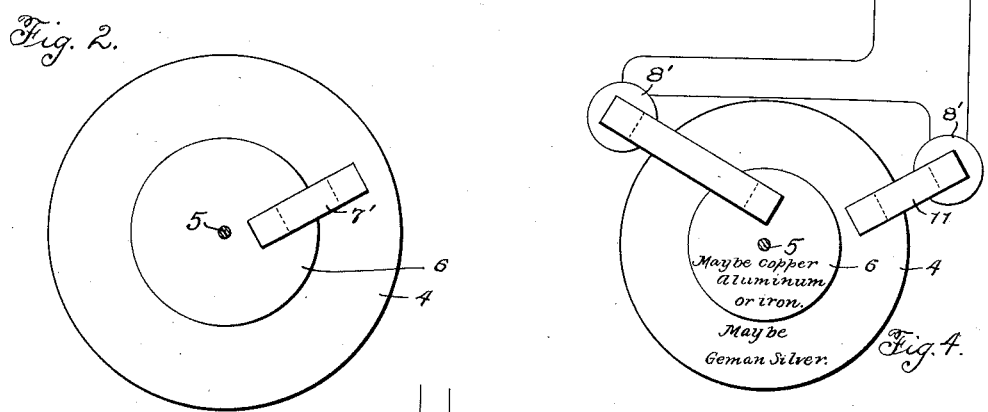
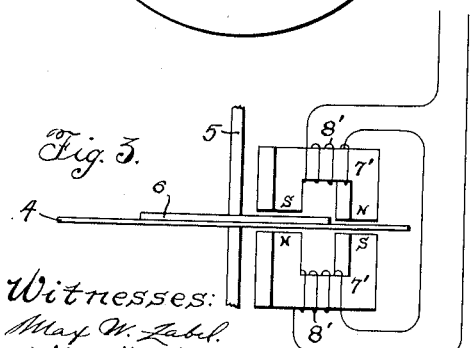
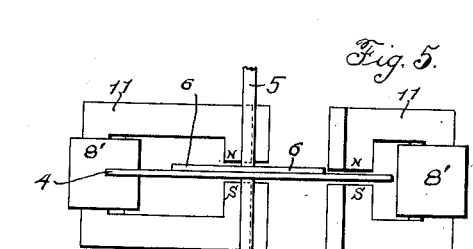
Witnesses:
Max W. Zabel.
Milton M. Alexander.
Inventor
Dugald C. Jackson,
By Charles A. Brown Cragg Belfield
Attorneys No. 875,179. PATENTED DEC. 31, 1907.
D. C. JACKSON.
ALTERNATING CURRENT MOTOR.
APPLICATION FILED APR. 1, 1901. RENEWED MAR. 17, 1904.

2 SHEETS—SHEET 2.

Witnesses:
Milton M. Alexander.
Max W. Zabel.

Inventor.
Dugald Caleb Jackson,
By Charles A. Brown Cragg & Belfield
Attorneys.

UNITED STATES PATENT OFFICE.

DUGALD C. JACKSON, OF MADISON, WISCONSIN.

ALTERNATING-CURRENT MOTOR.

No. 875,179.  Specification of Letters Patent.  Patented Dec. 31, 1907.

Application filed April 1, 1901, Serial No. 53,835. Renewed March 17, 1904. Serial No. 198,658.

*To all whom it may concern:*

Be it known that I, DUGALD C. JACKSON, citizen of the United States, residing at Madison, in the county of Dane and State of Wisconsin, have invented a certain new and useful Improvement in Alternating-Current Motors, of which the following is a full, clear, concise, and exact description, reference being had to the accompanying drawings, forming a part of this specification.

My invention relates to methods for operating alternating current motors, and more particularly to the operation of that class of motors known as induction motors, and has for its object the provision of an improved method by means of which a motor may operate in its preferred embodiment without difference of phase in the energizing circuits thereof. In my application Serial No. 48,056 filed February 20, 1901 I have described and claimed motors so constructed as to operate in accordance with the method hereinafter specifically set forth.

It is the prime object of my invention to provide a method in accordance with which a motor may be efficiently operated from single phase alternating current systems of distribution. Single phase induction motors have heretofore been constructed and operate generally by means of a uniformly wound short circuited armature (such as is used for polyphase induction motors) and a single phase alternating field. These motors, however, are not self-starting, but when the armature thereof is started revolving in a single phase alternating field, the balance of repulsions which exists when the armature is at rest, is disturbed and the armature tends to continue its motion. Since these motors are not of themselves self-starting, special devices for accomplishing this result must be employed. The devices for this purpose are very inefficient and frequently consume a large amount of power, as is the case when phase splitting is resorted to. It will be seen, however, that this operation as applicable to such motors, cannot give a large difference of phase between currents in motor field circuits with a reasonably large power factor, and for this reason such motors have either a very small starting torque or an unreasonably small power factor at starting. Other devices of like nature which are employed, render single phase motors cumbersome and inefficient. Single phase motors of the prior art have also been operated on the well known repulsion principle. Such motors may be self-starting, but are inefficient and bulky, as only a portion of the armature is continually effective.

By means of my invention I am enabled to operate a motor which is self-starting, without unreasonably decreasing the power factor, so that the motor exerts a considerable starting torque and which operates efficiently when running at its normal speed.

Generally speaking, my invention consists in the provision of a method for operating a motor in which simultaneously magnetizing or energizing currents induce in the armature conductors sets of currents that are of different phases, or time positions, and thereby cause the rotation of the movable armature.

In the preferred embodiment of the invention I provide a plurality of distinct paths for the armature currents and so design these paths or circuits that they have different time constants. I may accomplish this result by arranging the circuits of varying resistance, self-inductance or capacity, so that the currents in the circuits are out of phase, although induced by a single phase alternating field.

Figure 7:
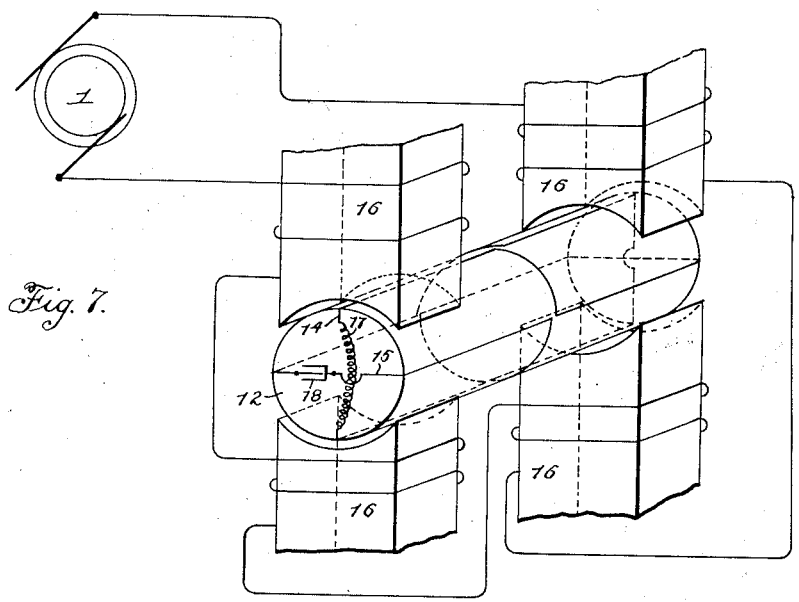

I will explain the operation of motors in accordance with my invention, more in detail by reference to the accompanying drawings illustrating the preferred embodiment thereof, in which, Figure 1 is a diagrammatic view of a motor constructed to operate in accordance with my invention; Fig. 2 is a top view of a modification of the motor shown in Fig. 1; Fig. 3 is a side view of the motor shown in Fig. 2; Fig. 4 is a top view of another modification of my improved motor; Fig. 5 is a side view thereof; Fig. 6 is a broken view partly in diagram, of another form of motor constructed to operate in accordance with my invention; Fig. 7 is a partial perspective of another embodiment of my invention.

Like characters of reference indicate like parts throughout the different figures.

Referring now more particularly to Fig. 1, I have shown a single phase alternating current generator 1, supplying current to the transmission circuit, comprising the mains 2, 2. A motive device 3, operating in accordance with my invention, receives current from said alternating current circuit, and comprises an armature 4 mounted upon a spindle 5. The circular armature disk 4 is provided with a preferably thicker portion 6, or portion of less resistance, at the central portion thereof, so that the construction of the armature is practically equivalent to two superimposed disks of unlike diameter but preferably of equal thickness, the construction being such that separate paths of differing resistances for currents induced in the armature are offered through the two portions of the armature disk. The field producing means for this device preferably consists of an electromagnet 7 which is energized by a coil 8 included in bridge of the supply mains 2, 2. One limb, 9, of the electromagnet 7 is placed preferably in close proximity to the thicker portion 6 and near the central portion thereof. The remaining limb 10 of the electromagnet 7 is preferably considerably shorter so that its face is opposite the thinner portion of the armature 4, the said limb also being placed preferably to the right of the limb 9 so that the said limbs are not on a radial line passing through said armature. When an alternating current passes through coil 8 the energization of the magnet 7 causes the armature 4 to revolve in the direction of the arrow as indicated. If the limb 10 be placed to the left of limb 9, as shown in dotted lines in the drawing, at 10', then the armature 4 will revolve in the opposite direction. Eddy currents are caused adjacent to each limb 9 and 10, the eddy current due to the limb 9 being constrained to flow within the thicker portion 6, and the eddy current due to the limb 10 flowing through the thinner portion of the disk of the armature 4, as is apparent from the drawings. The circuits of the eddy currents are thus of different resistance and self-inductance, as will be seen, and therefore have different time constants, whereby the said currents are out of phase and cause the rotation of the movable armature. Several such electromagnets set at intervals around the circumference of the armature may be used. The energizing windings of the several magnets may preferably be then connected in series, and the limbs of the several magnets should all be placed in the proper positions to give rotation in the same direction.
A modification of the device shown in Fig. 1 is shown in Figs. 2 and 3. In this instance two electromagnets 7', 7', are employed, the coils 8', 8', thereof being shown in series relation. The north pole of one magnet is opposite the south pole of the second magnet, so that a complete magnetic circuit is obtained. Currents of different phase are created in the armature, as described in connection with Fig. 1.
A further modification is illustrated in Figs. 4 and 5, in which instance two electromagnets 11, 11, are employed, the two limbs of each of the electromagnets approaching the two faces of the disk inclosed thereby.
The coils 8', 8', are again shown in series relation. The operation is similar to that previously described. The paths of different resistances and self-inductions, for the induced currents to flow in, may be produced by making the central circular portion 6 of the armature 4, of a different metal from the outer ring portion of the armature, as for instance the central portion may be of copper or aluminium and the outer portion of German silver, or the central portion may be iron and the outer portion of German silver. The central portion is still preferably thicker than the outer portion but not necessarily so.

Referring now to Fig. 6, I have shown another manner of constructing a motor to operate in accordance with my invention. In this case I employ a rotatably mounted drum or ring armature which is provided with suitable circuits of different time constants. I have here diagrammatically indicated two circuits and have shown each circuit as comprising one coil. It is well understood, however, that any suitable winding may be employed on the armature, the character of the winding simply being indicated in the drawing. The armature 12 is mounted upon suitable shafts 13 and carries two windings 14, 15. The windings 14 and 15 are preferably so constructed that they have different time constants so that under the influence of a single phase alternating field created by means of the salient poles 16, 16, currents of different phase will be conveyed through the said windings. The preferred manner of obtaining this result is shown in the drawing where I have included a self-inductive coil 17 in series with winding 14, and a condenser 18 in series with winding 15. Under the same influences of inductive energization, the currents in the two windings will be out of phase. Current is supplied to the electromagnet 16 from the generator 1. Motors operating in accordance with my invention are thus self-starting without decreasing materially the power factor of the circuit, and are efficient in their operation at normal speed or load. It will of course be understood that the winding here described and also in connection with Fig. 7, although generally requiring the characteristics as set forth, is not necessarily to be limited to one of two coils, but preferably consists of numerous conductors covering the armature core with a practically uniform conducting layer. This condition may of course be given by two uniformly wound progressive windings or two squirrel cages.

In Fig. 7 I have shown a modification of the motor illustrated in Fig. 6. In this instance the poles 16, 16, are disposed longitudinally of the armature and serve to react upon two armature windings 14 and 15 as before. Self-inductance 17 and capacity 18 are again included in the circuit. The scheme of winding which I prefer to employ in this connection, consists in passing an armature coil longitudinally upon both sides of the armature in a radial plane for about half the total length of the armature, then displacing the said coil about the armature through about ninety electrical degrees and then continuing said coil longitudinally of the armature for the remaining half thereof, as will be clear from the drawings. The effect in this instance of the longitudinally displaced poles 16, 16, is cumulative upon each coil of the armature. Instead of thus displacing the coils, one set of the poles may be angularly displaced an equal amount from their longitudinal position and the armature coils may then be wound without displacing half their lengths.

I have shown the windings of the armatures in Figs. 6 and 7 with their coils electrically independent of each other, but this is not essential as the paths of the currents of different phases may interlink without departing from my invention.

While I have herein shown and particularly described motors operating in accordance with the preferred embodiment of my invention, I do not wish to limit myself to the precise arrangements as herein shown and particularly described, as many modifications may be made by those skilled in the art without departing from the spirit of my said invention, but

Having thus described my invention, what I claim and desire to secure by Letters Patent is:—

1. The herein described method of operating induction motors which consists in creating a single phase alternating field, subjecting a closed revolubly mounted electric conducting circuit of given time constant to the action of said field, and subjecting a second closed revolubly mounted electric conducting circuit of different time constant and fixed with relation to the first aforesaid circuit to the action of said single phase alternating field, substantially as described.

2. The herein described method of operating induction motors which consists in creating a single phase alternating field, subjecting a revolubly mounted electric conducting circuit to the action of said field and subjecting a second revolubly mounted electric conducting circuit of different time constant fixed relatively to the first aforesaid circuit, to the action of said field, substantially as described.

3. The herein described method of operating induction motors which consists in creating a single phase alternating field, and subjecting a plurality of revolubly mounted electric conducting circuits of relatively different reactance or resistance to the action of said field in its normal unmodified condition, substantially as described.

4. The herein described method of operating induction motors which consists in creating a single phase alternating field, subjecting a rotatably mounted armature core to said field, said core having electric conducting circuits associated and revoluble therewith, and inducing in said electric circuits relatively out-of-phase currents, substantially as described.

5. The herein described method of operating induction motors, which consists in creating a single phase alternating field, subjecting a rotatably mounted armature core to said field, said core having independent electric conducting circuits associated and revoluble therewith, and inducing in said electric circuits currents which are relatively out of phase with respect to each other, substantially as described.

6. The herein described method of operating motors, which consists in creating a single phase alternating field, subjecting an armature to the action of said field in its normal unmodified condition, inducing in the armature windings relatively out-of-phase currents, substantially as described.

7. The method of operating motors, which consists in creating an alternating magnetic field, subjecting an armature to the action of said field, inducing relatively out of phase currents in the armature conductors thereby, and subjecting metal pieces to the magnetic action of the said out of phase currents.

8. The method of operating motors, which consists in creating an alternating magnetic field, subjecting an armature to the action of said field in its normal unmodified condition, and providing armature winding with relatively different time constants, whereby relative rotation is produced between said field and said armature.

9. The method of operating motors, which consists in creating a normal, unmodified alternating magnetic field, and subjecting a plurality of electric conducting circuits of relatively different time constants to the action of said field to produce relative rotation between said field and said circuits.

10. The herein described method of operating electric motors, which consists in creating a normal, unmodified single phase alternating field, subjecting a plurality of electric conducting circuits of relatively different reactance or resistance to the action of said field, and adapting said field and said circuits for relative rotation.

11. The herein described method of operating electric motors, which consists in creating a single-phase alternating field, subjecting an armature core to said field in its normal unmodified condition, providing said core with electric conducting circuits, and inducing relatively out-of-phase currents in said electric circuits, whereby relative rotation between said armature and said field is produced.

12. The herein described method of operating motors, which consists in creating an alternating magnetic field, subjecting a plurality of electrical conducting circuits to the action of said field in its normal unmodified condition, and inducing relatively out-of-phase electric currents in said electric circuits, whereby relative rotation between said fields and said circuits may be produced.

13. The herein described method of operating motors, which consists in creating an alternating magnetic field, subjecting an armature to the action of said field in its normal unmodified condition, and inducing relatively out-of-phase currents in said armature, whereby relative rotation between said field and said armature is produced.

14. The herein described method of operating motors, which consists in creating a single-phase alternating field, subjecting an armature core to said field in its normal unmodified condition, providing said core with independent electric conducting circuits, and inducing relatively out-of-phase currents in said electric circuits, whereby relative rotation between said core and said field may be produced.

In witness whereof, I hereunto subscribe my name this twenty ninth day of March A. D., 1901.

DUGALD C. JACKSON.

Witnesses:
 MAX W. ZABEL.
 GEORGE L. CRAGG.